July 13, 1937.  C. G. FSHER  2,086,665
ADVERTISING MODEL
Filed Oct. 9, 1935   2 Sheets-Sheet 1

Inventor
CARL G. FISHER,
By Joseph F. Gulick
Attorney

July 13, 1937.  C. G. FSHER  2,086,665

ADVERTISING MODEL

Filed Oct. 9, 1935  2 Sheets-Sheet 2

Inventor
CARL G. FISHER,
Joseph F. Gulick
Attorney

Patented July 13, 1937

2,086,665

UNITED STATES PATENT OFFICE 2,086,665

ADVERTISING MODEL

Carl G. Fisher, Miami Beach, Fla.

Application October 9, 1935, Serial No. 44,290

5 Claims. (Cl. 40—126)

This invention relates to improvements in models for display in show windows, show rooms or other places for the purpose of advertising some goods which may be supported by the model or for calling attention to other goods on exhibition in the room or window.

A general object is to provide a model which will arrest the attention of the passers-by and hold their attention and one in which the face of the model may be quickly changed without disturbing other portions of the model.

A further object is to provide means for lighting the face of the model and for flashing the lighting means to attract the attention of the public passing the window or thru the show room.

One method of effecting a quick change of the face of the model is to provide a head with a double face, one facing front and the other to the rear, the faces differing one from the other, as, for example, one being a blonde and the other a brunette. The head will be rotatably mounted upon the body of the model so that either face may be turned toward the front.

Further objects and advantages will become apparent from the description which follows.

Referring to the accompanying drawings which are made a part hereof and on which similar reference characters designate the same parts thruout the specification, Figure 1 denotes a show window having my invention therein and used to attract attention to merchandise in the window, Figure 2 is a front elevation of the invention, Figure 3 is a section on line 3—3 of Figure 2, Figure 4 is a side elevation of the new model head, Figure 5 is a section on line 5—5 of Figure 3, Figure 6 is a detail showing the lighting means, Figures 7 and 8 show the model displaying cigarettes, Figure 9 shows the model used to advertise a pipe.

Figure 1:
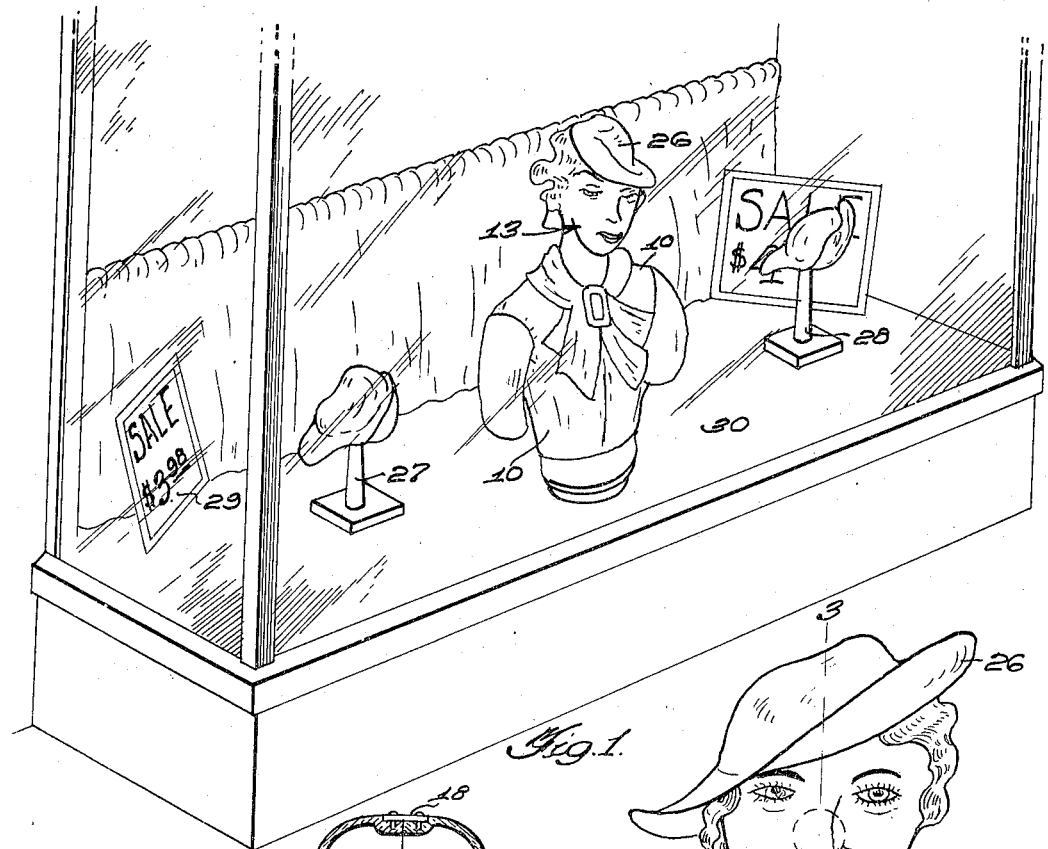
Figure 2:
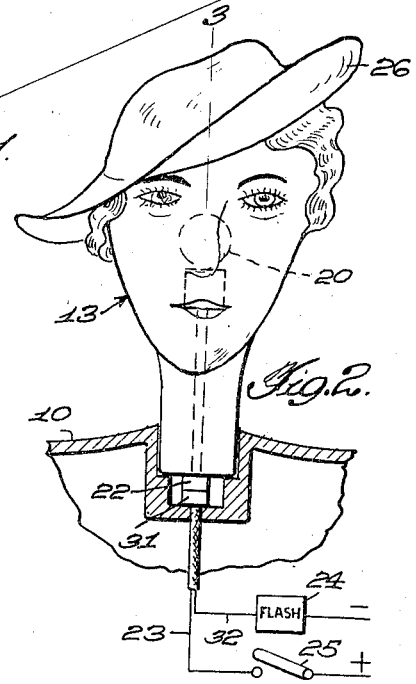
Figure 3:
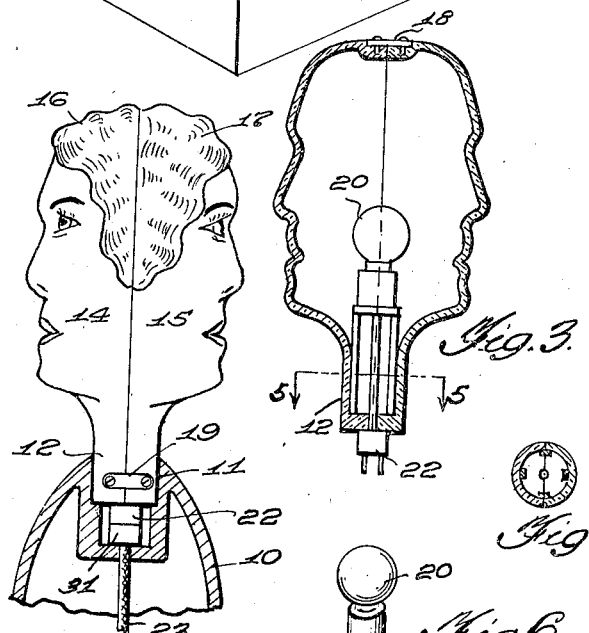
Figure 5:
Figures 4, 6:
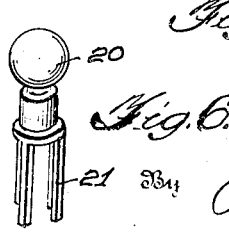

In the drawings numeral 10 indicates the bust of a model of conventional design having a socket portion 11 in which the neck portion 12 of the head 13 is received. The head may be freely rotated to position the face at any angular position or to rotate the head completely around. The head is constructed of two portions 14 and 15 each of which may represent a different face. For example, the face 14 may be that of a blonde and the face 15 that of a brunette, the former having light hair 16 and the latter dark hair 17. The faces may be those of either males or females. By simply rotating the face from the front to the rear and bringing the rear face to front to the rear the model is changed, for example, from a blonde to a brunette or vice versa.

The sections of the head may be held together in any suitable way. Such means should provide for ready exchange of heads or faces. As shown the faces are held together at the top by some suitable fastener 18 and at the bottom by a link 19 which is pivotally mounted on one section and engages over a pin in the other.

A globe 20 is positioned between the faces for illuminating them. This globe is mounted on a support 21 which may have resilient depending legs or prongs which engage the sides of the neck portion 12 for firmly holding the light or lights in place. The bulb or bulbs 20 may be colored any suitable tint to give the desired effect to the face.

The faces 14 and 15 will preferably be made of transparent or translucent material of any color. Examples of such material are glass, celluloid, mica, glucose, waterproofed paper or other waterproofed material. The faces may even be made of sheet metal or partly of sheet metal with parts of transparent material.

The bulb is connected thru plug 22 and socket 31 with current wires 23 and 32, a switch 25 being provided in the one and a flash 24 of any well known construction in the other.

Figure 7:
Figure 8:

The modified forms shown in Figures 7 and 8 are used to advertise some cigarette, one figure having a cigarette 33 in the mouth and the other having the cigarette 34 in the hand.

Figure 9:

The modified form shown in Figure 9 may advertise the pipe 35 which is in the mouth of the model or may advertise some brand of smoking tobacco positioned in the window or adjacent the model.

Figure 10:
Figure 10 shows the model having a fur piece thereon.

In Figure 10 the model is used to support a fur piece 36 and may be used in connection with a fur display in the window.

Figure 11:
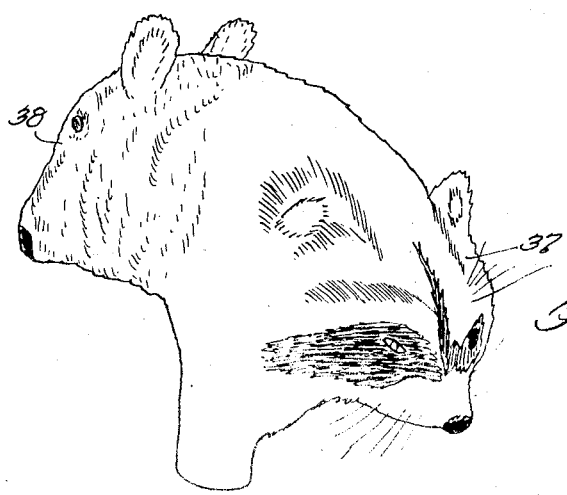
Figure 11 shows a modified head with animal faces.

In Figure 11 is shown a modified form of model head in the form of some animal or animals. In this figure, for example, one face 37 may be made to represent the face of a raccoon and the other face 38 may represent a bear's face. This head might well be used in displaying fur coats. Heads having faces of seals or foxes may obviously be used as well as the heads or faces of any other animal.

Lights may be placed in the heads just described, the faces all being made of transparent or translucent material. As in the forms shown in Figures 1 to 6 means may be provided for fastening the opposite faces together and for turning on and off the light to give the flash to attract attention.

While the model heads may be used simply to attract attention by the flashing and by the model face it serves a further purpose of supporting the articles on display as the hat 26, the cigarettes 33, 34, the pipe 35 and the fur 36. In addition to that it may call attention to articles on display as 27 and 28 and price cards 29 in show window 30.

While the model head has been shown as composed of two faced portions this is not to be construed as a limitation of the invention. The head may be made with a removable face and back head portion.

While the model has been shown in relation to merchandise exhibited for sale it is not limited to this use but may find utility in other ways as to attract attention to anything on exhibition or display. The faces or form of the model may be made artistic, humorous or grotesque depending on the effect desired to be created on the spectators.

It is obvious that various changes may be made in my invention without departing from the essentials thereof, I, therefore, do not limit myself to the invention as specifically shown and described but only as set forth in the appended claims.

What I claim is:

1. In a device of the kind described the combination with the body portion of a model of a head portion rotatably carried by the body portion and comprising front and rear sections each resembling a human face, and made of tinted translucent material, a light bulb resiliently held between said sections, conduits extending thru said body portion to said bulb, and a switch and a flasher in said conduits.

2. A model having a removable rotatable head mounted thereon said head composed of face portions differing one from the other one of said face portions having an article of merchandise mounted therein.

3. A removable head for a store model comprising separable front and back sections made to resemble animal faces and differing one from the other said faces being of translucent material.

4. In a device of the kind described the combination with the body portion of a model, of a head portion rotatably carried by the body portion and comprising front and rear sections made of translucent material, a light bulb held between said sections and fluid circuit conduits extending thru said body portion to the said bulb for lighting the same.

5. In a device of the kind described the combination with the body portion of a model of a head portion rotatably carried by the body portion and comprising front and rear sections each resembling a human face but differing one from the other and made of translucent material, a light bulb held between said sections, conduits extending thru said body portion to said bulb and a switch in said conduits.

CARL G. FISHER.